United States Patent [19]

Carpino

[11] 4,244,211
[45] Jan. 13, 1981

[54] APPARATUS FOR MEASURING SMALL WEIGHT CAPACITIES OF LIQUIDS

[75] Inventor: Ugo Carpino, Milan, Italy

[73] Assignee: T.E.A. Tecniche Elettroniche Applicate S.r.l., Milan, Italy

[21] Appl. No.: 3,768

[22] Filed: Jan. 11, 1979

[30] Foreign Application Priority Data

Jan. 12, 1978 [IT] Italy .............................. 19216 A/78

[51] Int. Cl.³ ...................... G01M 15/00; G01F 9/00; G01F 23/20
[52] U.S. Cl. ........................................ 73/113; 73/309
[58] Field of Search ................................. 73/309, 113

[56] References Cited

U.S. PATENT DOCUMENTS

| 2,342,696 | 2/1944 | Röer | 73/309 |
| 2,911,830 | 11/1959 | Binford | 73/309 |
| 3,795,140 | 3/1974 | Nishihara | 73/309 X |
| 3,835,700 | 9/1974 | Gamble | 73/113 |

*Primary Examiner*—Gerald Goldberg
*Assistant Examiner*—Joseph W. Roskos
*Attorney, Agent, or Firm*—Young & Thompson

[57] ABSTRACT

An apparatus for measuring small weight capacities of liquids comprises a vessel to be filled with the liquid; a pipe for the delivery of said liquid from said vessel; a body immersed in said liquid and supported in a substantially fixed position, within the vessel, by a lever adapted to transmit the buoyancy acting on said body to an electric transducer; an electronic shunt circuit fed by the output of said transducer; and a measuring instrument fed by the output of said electronic shunt circuit through an amplifier.

7 Claims, 2 Drawing Figures

APPARATUS FOR MEASURING SMALL WEIGHT CAPACITIES OF LIQUIDS

BACKGROUND OF THE INVENTION

The present invention relates to an apparatus for measuring small weight capacities of liquids absorbed or consumed by systems or apparatuses being fed from containers communicating with the atmosphere.

A typical example of application of this apparatus is for measuring fuel consumption in an internal combustion engine, during its bench test.

To date, engine fuel consumption has been measured with systems adapted to determine the time required to consume a certain volume or a certain weight of the fuel fed, with remarkable inconveniences for the long time required for the measuring and, in the case of volume timing, also for the precision. The inconvenience deriving from the long time required for measuring is particularly serious where inspection and adjustment during production is involved, for example in engine test rooms.

These inconveniences are entirely eliminated with the apparatus according to the invention, which can besides be applied also in many other fields requiring the measuring of small weight capacities of liquids.

SUMMARY OF THE INVENTION

The apparatus according to the invention is substantially characterized in that it comprises: a vessel to be filled with the liquid the weight capacity of which has to be measured; a pipe for the delivery of said liquid from said vessel; a body immersed in said liquid and supported in a substantially fixed position, within the vessel, by a lever adapted to transmit the buoyancy acting on said body to an electric transducer; an electronic shunt circuit fed by the output of said transducer; and a measuring instrument fed by the output of said electronic shunt circuit through an amplifier. In this apparatus, the vessel can be appropriately filled through a pipe controlled by a solenoid valve, and the level of the vessel is varied between a minimum and a maximum by way of an electronic circuit, adapted to compare the signal indicating the buoyancy actually acting on the body immersed in the liquid, with signals indicating the minimum and maximum values of the buoyancy itself, corresponding to said minimum and maximum levels, said circuit controlling said solenoid valve. Moreover, the electronic comparison circuit which controls the feeding of the liquid to the vessel, prevents the transmission of the signal from the electronic shunt circuit to the measuring instrument during the time in which the liquid is fed to the vessel, during this time the instrument being fed by a fixed signal of a value corresponding to that of the last signal transmitted.

BRIEF DESCRIPTION OF THE DRAWINGS

The invention will now be described in further detail, by mere way of example, with reference to the accompanying drawings, in which.

DESCRIPTION OF THE PREFERRED EMBODIMENTS

Figure 1:
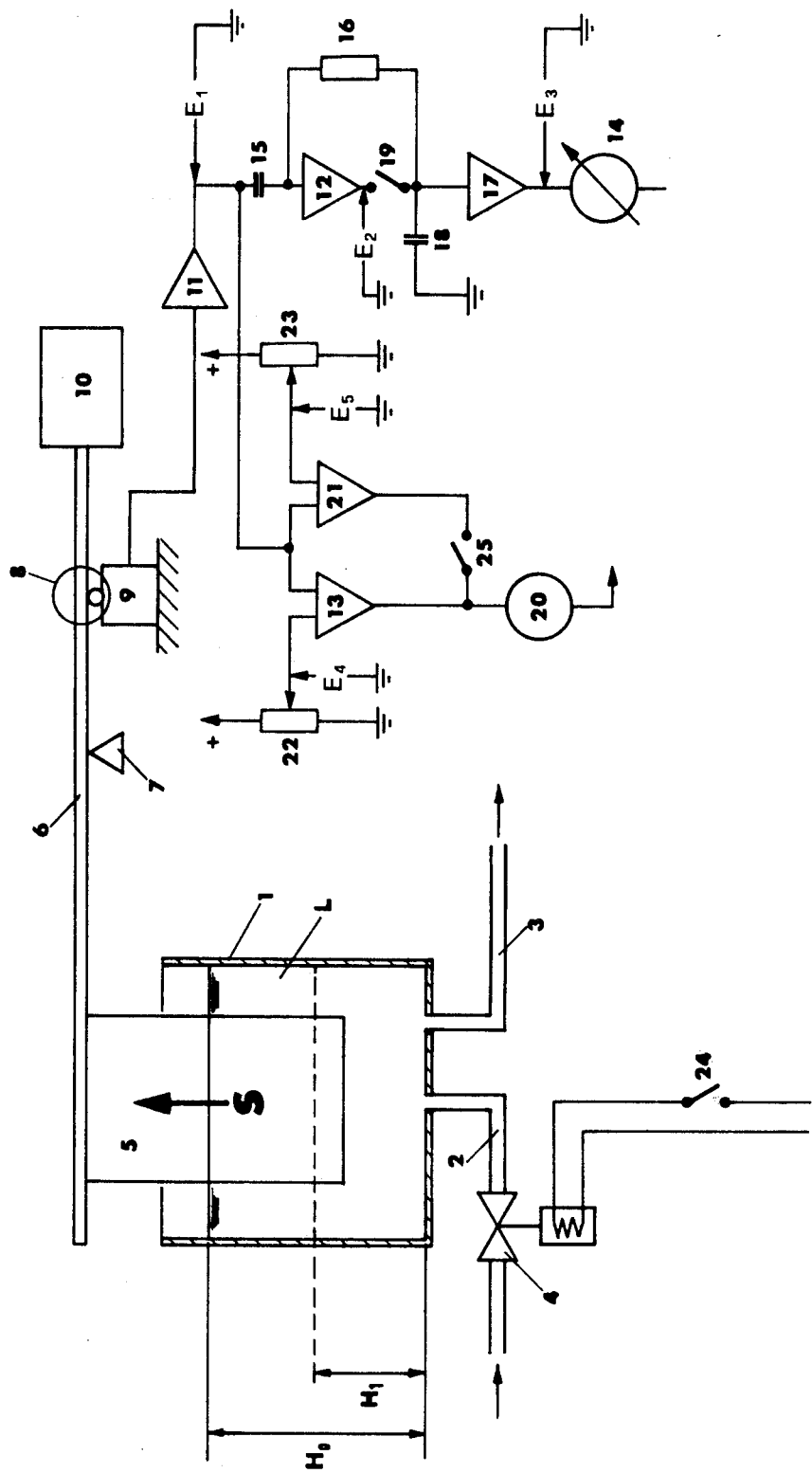
FIG. 1 is a scheme of the apparatus according to the invention, adapted to be used, for example, for measuring fuel consumption in a test room for internal combustion engines.

With reference to the drawings and in particular to FIG. 1, the apparatus according to the invention comprises a cylindrical vessel 1, connected through a pipe 2 to the supply of a liquid L (which may arrive from a tank or from a pressure network) and through the pipe 3 to the utilizing source—in this case, to an engine being tested—the feeding pipe 2 being controlled by a solenoid valve 4.

A cylindrical body 5 is immersed in the liquid L, inside the vessel 1, said body 5 being fixed to a lever 6, fulcrumed at an intermediate point 7 and bearing, at 8—close to its end remote from said body 5—upon a force transducer 9 (for example of the type with strain gauges).

(The transducers with strain gauges—elements already known for a long time and to be found on the market in a wide variety of shapes and characteristics—are essentially comprised by an elastic body, being deformed under the action of an applied force and the deformation of which, usually of very reduced magnitude (of the order of hundredths or, at the most, tenths of millimeter), is measured by means of electrical resistance strain gauges. The strain gauges, suitably connected one to the other and appropriately fed, supply an electric voltage of the order of a few tenths of a mV, proportional to the intensity of the applied force, which can be thus very easily measured).

On the end of the lever 6, remote from the body 5, is moreover mounted a counterweight 10, used to balance the system in such a way that, when the vessel 1 is empty, the lever 6 is on balance and no force is applied to the transducer 9. However, when the liquid fills the vessel 1, it creates a buoyancy S—varying according to its level—acting to the body 5 which, by an imperceptible movement, transmits the pressure, through the lever 6, to the transducer 9. The electric signal of said transducer thus indicates the value of said buoyancy.

The signal delivered by the transducer 9 is fed to an amplifier 11, which amplifies it and the output of which supplies a voltage $E_1$ which is hence proportional to the buoyancy S acting on the body 5 in the vessel 1. This can be expressed as follows:

$$E_1 = K_1 S + K_2 \tag{1}$$

The voltage $E_1$ is applied to an electronic shunt, formed by an operational amplifier 12, a capacitor 15 and a resistor 16. As known, the output voltage $E_2$ of the circuit is:

$$E_2 = K_3 \frac{dE_1}{dt} \tag{2}$$

wherein $$\frac{dE_1}{dt}$$

is the derivative in respect of the time of the voltage $E_1$ and $K_3$ is a constant, the value of which is given by the product of the capacity of the capacitor 15 multiplied by the resistance of the resistor 16.

Taking into account (1), we can express (2) as follows:

$$E_2 = K_4 \frac{dS}{dt} \quad (3)$$

where $K_4$ is again a constant.

Supposing the valve 4 is closed, the capacity Q being delivered from the pipe 3 is nil, and the vessel 1 is filled with liquid up to the level Ho. In such conditions, a constant pressure So is exerted on the body 5, the voltage $E_1$ is also constant and the voltage $E_2$ is consequently nil.

If a certain capacity Q is now delivered through the pipe 3, the level of the liquid L contained in the vessel 1 goes down, and the buoyancy S acting on the body 5 immersed in the liquid L is thereby reduced. According to the principle of Archimedes and to simple geometrical considerations, taking into account that the vessel 1 and the body 5 are taken to be perfectly cylindrical and with vertical axis, it is easy to prove that the variation of the buoyancy through a given time interval is proportional to the variation of the weight of liquid L contained in the vessel 1.

This fact can be mathematically expressed as follows:

$$\frac{dS}{dt} = K_5 \frac{dP}{dt} \quad (4)$$

where $K_5$ is a constant, $$\frac{dS}{dt}$$

is the derivative in respect of the time of the buoyancy S and dP/dt is the derivative in respect of the time of the weight of liquid L contained in the vessel 1.

But dP/dt is nothing other than the weight capacity Q delivered through the pipe 3, whereby one has:

$$\frac{dS}{dt} = K_5 Q \quad (5)$$

On the basis of expression 3) it can be said that:
$$E_2 = K_6 Q \quad (6)$$

namely, it can be concluded that the voltage $E_2$ available at the output of the amplifier 12 is therefore in turn proportional to the capacity Q.

The voltage $E_2$, by way of a normally closed contact 19 of an electromagnetic relay 20, is connected to an operational amplifier 17 with unitary gain, of the electromagnetic type, namely with a practically infinite input impedance. If the contact 19 is closed, the voltage $E_3$ delivered from the amplifier 17 is equal to $E_2$ and thus proportional to the weight capacity Q delivered from the vessel 1. Said voltage can be measured by means of the voltometer 14, the scale of which can be graduated into values of weight capacity, for the direct reading of this latter. On the other hand, the voltage $E_1$ is compared, through comparators 13 and 21, with voltages $E_4$ and $E_5$ obtained from potentiometers 22 and 23 fed at a constant voltage. When the level of the liquid in the vessel 1 goes down to a certain minimum preset value (for example $H_1$ in FIG. 1), the comparator 21 excites the relay 20 which, while opening the already considered contact 19, closes the contact 24 of the valve 4, of which it causes the opening, so that new liquid is let into the vessel 1 through the pipe 2.

The level in this vessel increases up to a maximum preset value (for example $H_o$ in FIG. 1), after reaching which the comparator 13 de-energizes the relay 20. As a consequence, the contact 19 closes again and the contact 24 opens, the valve 4 closes and a new cycle for emptying the vessel starts again. By appropriately dimensioning the system, the filling time can be shortened in respect of the emptying time. During the filling time, the delivery of the capacity Q continues, but the voltage $E_2$ delivered from the amplifier 12 no longer represents the outgoing capacity. This has no consequences since, during the filling, the contact 19 is open. The amplifier 17 then receives the voltage accumulated in the capacitor 18, having a value equal to the value of the voltage $E_2$ at the moment in which the contact 19 had opened. In substance, the output voltage $E_3$, during the short length of time in which the vessel is filled, continues to represent the value of the capacity delivered at the last instant of the emptying cycle. Upon finishing of the filling cycle, the voltage $E_3$ goes back to indicating the effective instantaneous capacity.

This small discontinuity in the availability of the instantaneous capacity datum is, in many applications, acceptable and it can on the other hand be appropriately signaled.

Compared to the systems heretofore adopted, for measuring the time employed for the delivery of a certain weight or volume of liquid, the device according to the invention allows one to obtain first of all the advantage of providing a practically continuous measurement. Moreover, since what is measured in the device itself is the buoyancy acting on the body 5, there are also the highly important advantages of:

eliminating the errors deriving from the influence of the pipes connecting the vessel 1 to the feeding and utilizing sources; and obtaining great variations of buoyancy with small deliveries of liquid from the vessel 1 (in fact, the value of the constant $K_5$ appearing in the formula (5) is a function of the ratio $D_2/D_1$ between the inside diameter of the vessel 1 and the outer diameter of the body 5 and it tends to $\infty$ when said ratio tends to 1).

The first of the aforespecified advantages could also be obtained with a device derived from the one heretofore described, but operated by the weight of the liquid L in the vessel 1, and not by the buoyancy S acting on the body 5. However, the performance of such a device would still be far poorer than that of the device heretofore described, in that said device would not allow one to obtain the other two advantages (which make the device particularly suited for measuring small and very small weight capacities, which it would be very difficult to measure with other systems.)

Figure 2:
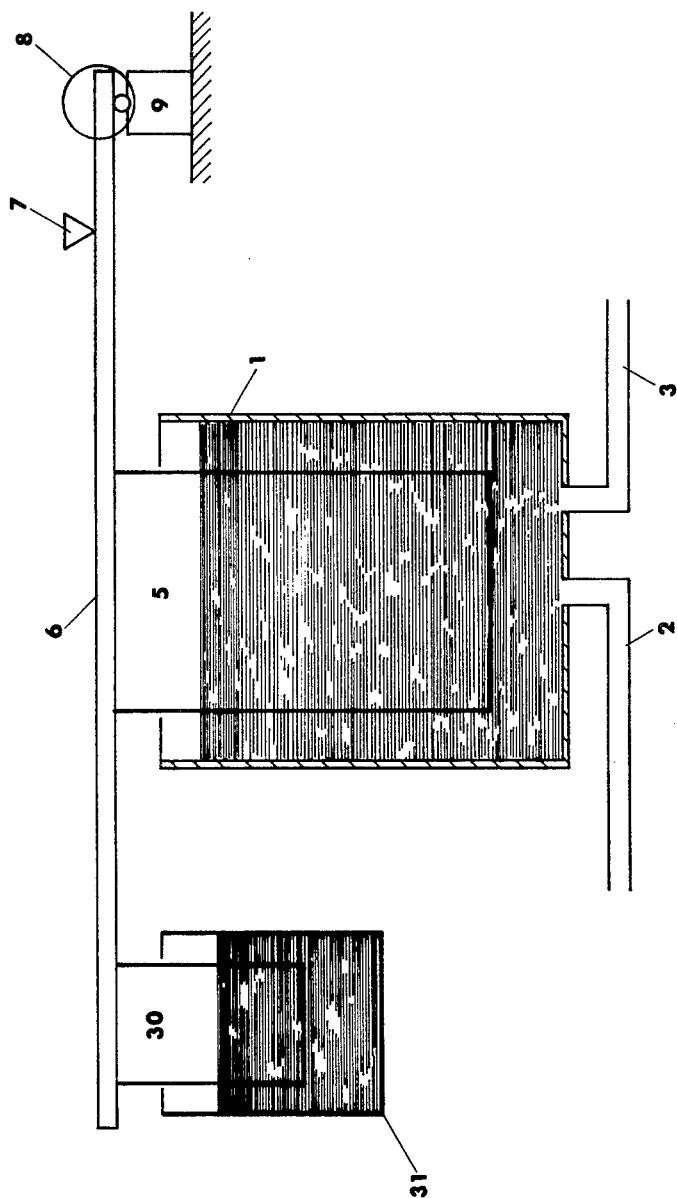
FIG. 2 shows a different embodiment of the apparatus of FIG. 1.

FIG. 2 shows a different embodiment of the apparatus of FIG. 1, wherein the force required for balancing the lever 6 when the vessel 1 is empty, is provided—instead of by a counterweight 10—by the buoyancy acting on a body 30 immersed in a closed vessel 31 filled with a liquid of suitable viscosity (for example glycerine). One obtains thereby a reduction of the moment of inertia of the moving parts of the apparatus and a damping action determined by the viscosity of the liquid contained in the vessel 31.

This provides a better dynamic behaviour of the system, avoiding also the risk of oscillations of the moving parts.

It is of course understood that the apparatus according to the invention may be realized also in a different embodiment from those heretofore described and illustrated, or with further modifications being made to the same. It should be noted, for example, that also the use of the force transducer with "strain gauges" is merely indicative, in that any type of transducer, adapted to deliver an electric signal proportional to the buoyancy, may equally well be used. For example, transducers with differential transformer or with variable inductance could be adopted, or else electrodynamic transducers with balanced forces.

I claim:

1. Apparatus for measuring small weight capacities of liquids, characterized in that it comprises: a vessel to be filled with the liquid the weight capacity of which is to be measured; a pipe for the delivery of said liquid from said vessel; a body immersed in said liquid and supported in a substantially fixed position, within the vessel, by a lever adapted to transmit the buoyancy acting on said body to an electric transducer; an electronic shunt circuit fed by the output of said transducer; and a measuring instrument fed by the output of said electronic shunt circuit through an amplifier, the body immersed in the liquid being connected to one end of a lever, fulcrumed at an intermediate point and balanced at the opposite end, close to which end said lever bears on said transducer.

2. Apparatus as in claim 1, wherein the vessel can be filled through a pipe controlled by a solenoid valve and the level of the vessel is varied between a minimum and a maximum by way of an electronic comparison circuit, adapted to compare the signal indicating the buoyancy actually acting on the body immersed in the liquid, with signals indicating the minimum and maximum values of the buoyancy itself, corresponding to said minimum and maximum levels, said circuit controlling said solenoid valve.

3. Apparatus as in claim 1 wherein said transducer is a transducer of the type with "strain gauges".

4. Apparatus as in claim 1 wherein a signal emitted by the transducer is amplified before being fed to the electronic shunt circuit.

5. Apparatus as in claim 2 wherein the electronic comparison circuit which controls the feeding of the liquid to the vessel prevents the transmission of the signal from the electronic shunt circuit to the measuring instrument during the time in which the liquid is fed to the vessel, during this time the instrument being fed by a fixed signal of a value corresponding to that of the last signal transmitted.

6. Apparatus as in claim 1 wherein said measuring instrument is calibrated directly in values of weight capacity.

7. Apparatus for measuring small weight capacities of liquids, characterized in that it comprises: a vessel to be filled with the liquid the weight capacity of which is to be measured; a pipe for the delivery of said liquid from said vessel; a body immersed in said liquid and supported in a substantially fixed position, within the vessel, by a lever adapted to transmit the buoyancy acting on said body to an electric transducer; an electronic shunt circuit fed by the output of said transducer; and a measuring instrument fed by the output of said electronic shunt circuit through an amplifier, the body immersed in the liquid being connected to an intermediate point of a lever, to one end of which there is fixed a similar body immersed in a viscous liquid and the opposite end of which bears on said transducer, said lever being fulcrumed close to its point bearing on said transducer.

* * * * *